United States Patent [19]

Ager

[11] 4,145,817

[45] Mar. 27, 1979

[54] ELEVATION MEASURING APPARATUS

[76] Inventor: Charles A. Ager, 15423-34th Ave., Surrey, British Columbia, Canada, V3S 4N7

[21] Appl. No.: 837,445

[22] Filed: Sep. 28, 1977

[51] Int. Cl.² .............................................. G01C 5/04
[52] U.S. Cl. ................................................... 33/367
[58] Field of Search ..................... 33/366, 367; 73/723

[56] References Cited

U.S. PATENT DOCUMENTS

| | | | |
|---|---|---|---|
| 2,532,883 | 12/1950 | Bennett et al. .......................... | 33/366 |
| 2,557,021 | 6/1951 | Williams .............................. | 33/367 X |
| 3,269,023 | 8/1966 | Calkins ................................ | 33/367 X |
| 3,645,135 | 2/1972 | Hadley ................................ | 33/367 X |
| 4,026,156 | 5/1977 | Bowditch et al. .................. | 33/367 X |

Primary Examiner—Charles E. Phillips
Attorney, Agent, or Firm—Fetherstonhaugh & Co.

[57] ABSTRACT

Apparatus for determining the difference in height between two widely spaced apart locations utilizes a length of hose filled with fluid. A pressure transducer is secured to each opposite end of the hose in a position to be influenced by fluid pressure incidental to the hose ends being disposed one at each of the locations. The transducers are electrically connected to a source of power and to instruments which cooperate to provide an indication of the difference in elevation between the two locations.

5 Claims, 4 Drawing Figures

U.S. Patent  Mar. 27, 1979  Sheet 1 of 2  4,145,817
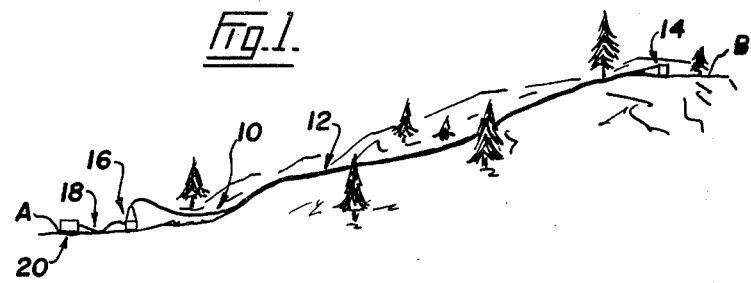
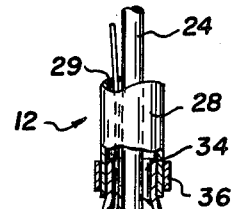
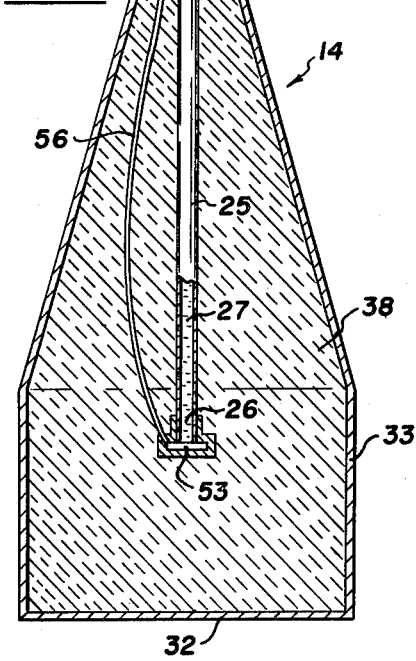
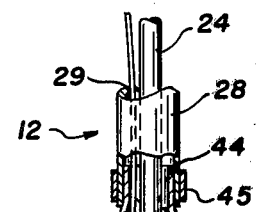
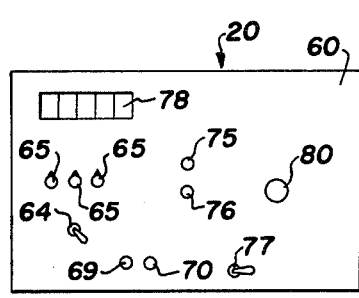
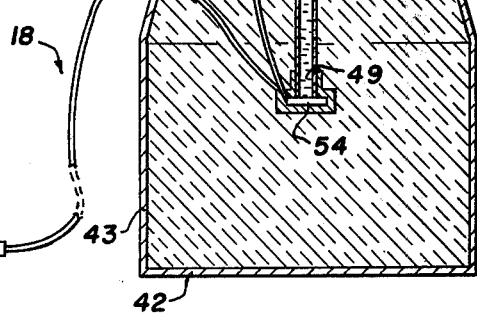

ELEVATION MEASURING APPARATUS

My invention relates to apparatus for measuring heights of objects and more particularly to heights of land during survey work.

Normally, land elevations are determined by use of conventional surveying instruments but in forested areas or rugged terrain it is sometimes difficult to obtain a clear sight between one location and another. This will sometimes require that a path be cleared through the brush or trees which is both time consuming and costly in terms of labor.

The present invention offers an extremely effective solution to this problem by providing a device which senses the difference between two hydrostatic pressures developed at remote locations and converts that difference into a unit of height indicative of the difference in elevation between those locations. More specifically, an elevation measuring apparatus in accordance with the present invention comprises a length of hose having opposite ends adapted to be placed at first and second locations of different elevations, a pressure transducer at each opposite end, a body of fluid completely filling the hose between the pressure transducers whereby said transducers are responsive to pressures exerted by said fluid at opposite ends of said hose, and conduit means connecting pressure transducers to a source of electrical power, said circuit means including a height indicator whereby the difference in output voltages of the pressure transducers is fed as a proportionate voltage to said height indicator thereby indicating the difference in height between the first and second locations.

In drawings which illustrate a preferred embodiment of the invention,

FIG. 1 is a schematic view showing the present elevation measuring apparatus in a position of use, FIG. 2 is a vertical section, part in elevation, showing a housing and associated parts at one end of the apparatus.

FIG. 3 is a similar view of a housing and associated parts at an opposite end of the apparatus.

Figure 4:
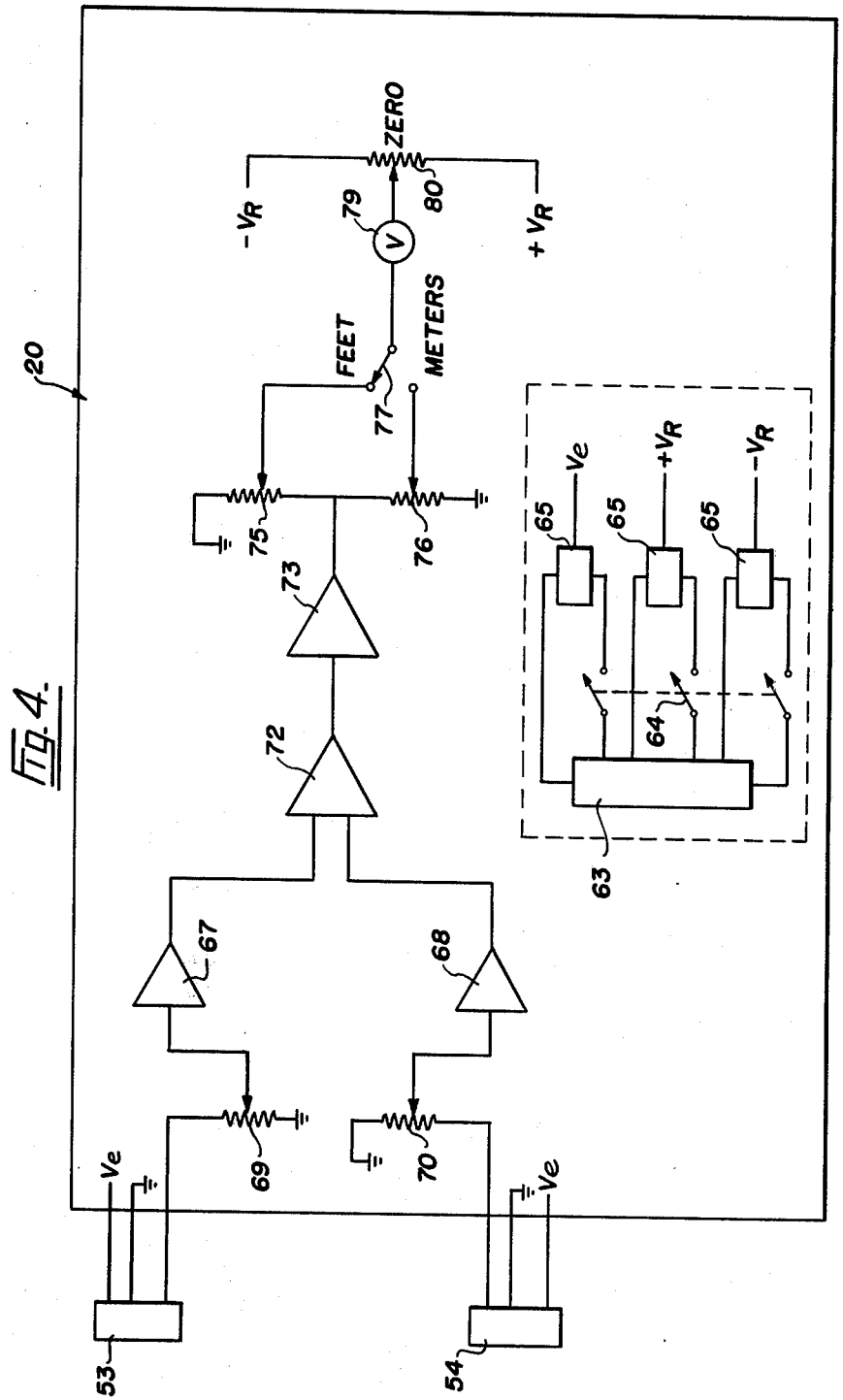
FIG. 4 is a blocked diagram of a control box forming part of the elevation measuring apparatus.

Referring to the drawings, the numeral 10 indicates generally an elevation measuring apparatus constructed in accordance with the present invention. FIG. 1 shows the apparatus 10 in a typical position of use arranged to measure the distance in height between location A and location B. The area between the two locations is such that required readings cannot be obtained using conventional survey instruments.

Briefly, the apparatus 10 comprises a flexible member 12 which is long enough to be trailed through the woods to extend between the two locations. The member 12 interconnects housings 14 and 16. A circuit means 18 is partly enclosed within the flexible member and the two housings, the means being otherwise enclosed within or carried by a control box 20 located near the housing 16.

The flexible member generally indicated by the numeral 12 can be seen in FIG. 2 to comprise a length of hose 24 which has an end portion 25 terminating in an end 26. Opposite ends of the hose are plugged as will be described later and the hose is completely filled with water or other suitable fluid which, in FIG. 2, is indicated at 27. The flexible inner hose 24 is protected by a flexible outer hose 28 of slightly greater diameter so that an annular space 29 is provided between in the inner and outer hoses.

The housing generally indicated at 14 is shown in FIG. 2 to be a substantially cone-shaped structure having a flat bottom wall 32 and a peripheral wall 33 which tapers inwardly to a cylindrical neck 34. A clamp 36 secures one end of the outer hose 28 to the neck 34 of the housing. The housing 14 is filled with a suitable cellular insulating and shock-absorbing material 38 which supports the end portion 25 of the hose on the longitudinal axis of the housing and with the hose end 26 located a predetermined distance from the bottom wall 32. The distance between the hose end 26 and the bottom wall 32 is equal to the distance between the longitudinal axis of the housing and the outer surface of the housing near the bottom wall.

Referring now to FIG. 3, the hose 24 has its other end portion 40 mounted within the identically constructed housing 16. This housing has walls 42 and 43 as well as a neck 44 which is secured to the terminal end of the outer hose 28 by a clamp 45. Insulating and shock-absorbing material 47 fills the interior of the housing 16 with the portion 40 again being located on the longitudinal axis of the housing and with hose end 49 spaced the same distance from the bottom wall 42 as the opposite end 26 of the hose is spaced from the wall 32.

The circuit means generally indicated at 18 of the present apparatus includes two pressure transducers which are indicated at 53 and 54 in FIGS. 2, 3 and 4. These conventional pressure-sensitive transducers, or sensors as they are commonly called, serve to plug the opposite ends 26 and 49 of the hose 24. The devices are suitably secured to the tube ends so as to provide a proper seal against escape of the fluid 27 and the arrangement is such that any pressures developed by the fluid at opposite ends of the tube 24 are sensed by the transducers and that sensing is made use of as will be explained later.

Transducers 53 and 54 are interconnected by conductor wires 56 of the circuit means 18, these wires extending through the annular space 29 between the outer and inner hoses. Other conductor wires 57 (see particularly FIG. 3) of the circuit connect the pressure transducers to the control box 20 which has a face panel 60. Appearing on the face panel 60 are suitable controls for the apparatus 10 which appear in FIG. 3 and which will now be described with reference to FIG. 4.

Also included in the circuit means 18 is a source of power stored within the box 20. The power source consists of a bank of batteries 63. An on-off switch 64 is located between the battery bank 63 and three voltage regulators which are each indicated by the numeral 65. These three regulators ensure constant output voltages from the batteries which steadily decreases with usage. Thus, the voltage regulators 65 provide the apparatus with the desired stability and accuracy even though powered by progressively weakening batteries.

The output from the transducers 53 and 54 is fed to amplifiers 67 and 68 through gain controls 69 and 70, see particularly FIG. 4. These gain controls are necessary since the transducers are seldom of indentical construction and therefore their outputs will vary slightly. Amplifiers 67 and 68 isolate the transducers from another amplifier 72 which is connected into the circuit 18 to act as a subtractor. In other words, the amplifier 72 output is the difference between the outputs of the amplifiers 67 and 68 and that differential output is fed to still another amplifier 73. Voltage is boosted by the amplifier 73 and is conducted through potentiometers 75 and 76 to opposite contacts of a switch 77. Operation of the switch 77 provides for a readout in either feet or meters on a digital counter 78 (FIG. 3) which operated by a voltmeter 79 (FIG. 4). Alternatively, the voltmeter 79 may have a conventional swing indicator reading on a scale marked in feet or meters. The voltmeter 79 is also connected to a potentiometer 80 which enables the voltmeter to be set at 0. The zero setting of the voltmeter 79 is necessary since the two pressure transducers 53 and 54 are seldom perfectly matched and therefore there is a small residual voltage reading on the voltmeter when the two transducers are at the same height. Assuming matched pairs of transducers are available, then the potentiometer 80 is not required.

The elevation measuring apparatus 10 is used as illustrated in FIG. 1 by first setting up the housing 16 and control box 20 at location A. Housing 14 is then carried through the woods while the flexible member 12 is uncoiled and laid upon the ground until location B is reached whereupon the second housing is set up. It will be noted that it is not necessary to place either housing upright, that is, with the bottom walls 32 or 42 in contact with the ground surface at the two locations. The housings can be placed on their sides if desired as is housing 14 in FIG. 1. The transducers are supported within their housings to permit either placement since the transducer 53 and 54 are at the same height above ground in either case.

The elevation measuring apparatus 10 is now ready to be operated and the user activates the apparatus by closing the switch 64 and manipulating the other controls on the face of the box 20 to energize the circuit 18 and measure the height of location B above location A.

This measurement is proportionate to the difference in the pressures exerted by the fluid 27 upon the transducers 53 and 54. The pressure differential influences the output from the transducers so that the output becomes an analog voltage which is proportionate to the fluid pressure. Amplifiers 67 and 68 separately receive the outputs from the transducers and the amplifier 72 substracts one voltage from the other before feeding the voltage differential to amplifier 73. The voltmeter 79 receives the output from the amplifier 73 and actuates the digital counter 78 to provide a reading in feet or meters (according to the position of switch 77) which informs the user of the height of location B above location A.

From the foregoing, it will be apparent this invention provides a device which can quickly and accurately determine elevation on terrain where it is not practical to use conventional surveying techniques.

I claim:

1. Elevation measuring apparatus comprising a first length of hose having opposite ends adapted to be placed at first and second locations of different elevations, a body of fluid completely filling the hose between the ends thereof, first and second electrical pressure transducers disposed in direct contact with the body of fluid at the opposite ends of the hose in sealing relationship with the hose so as to be responsive to pressures exerted by said fluid at opposite ends of said hose, an electrical conductor wire extending along said hose between said transducers, and second length of hose surrounding said first length of hose and said conductor wire along the length thereof, and circuit means connecting the pressure transducers to a source of electrical power, said circuit means including a height indicator means for receiving a proportionate voltage corresponding to differences in output voltages of the pressure transducers and for, responsive to said voltage, indicating the difference in height between the first and second locations.

2. Elevation measuring apparatus comprising a length of hose having opposite ends adapted to be placed at first and second locations of different elevations, a pressure transducer attached to each opposite end, a body of fluid completely filling the hose between the pressure transducers whereby said transducers are responsive to pressures exerted by said fluid at opposite ends of said hose, a housing enclosing each opposite end of the length of hose, said housings each containing material supporting the pressure transducer in a predetermined position therein, and circuit means connecting the pressure transducers to a source of electrical power, said circuit means including a height indicator whereby the difference in output voltages of the pressure transducers is fed as a proportionate voltage to said height indicator thereby indicating the difference in height between the first and second locations.

3. Elevation measuring apparatus as claimed in claim 2, wherein said second length of hose is secured at opposite ends thereof to the housings.

4. Elevation measuring apparatus as claimed in claim 2, in which said source of power is a battery source, and said circuit means also includes a voltage regulator for maintaining the output from said battery source at a substantially constant value.

5. Elevation measuring apparatus as claimed in claim 2, in which said circuit means also includes a gain control for presetting the output voltages of the pressure transducers to zero.

* * * * *